United States Patent
Ito et al.

(10) Patent No.: US 8,022,648 B2
(45) Date of Patent: Sep. 20, 2011

(54) MOTOR DRIVING CIRCUIT

(75) Inventors: Hideaki Ito, Kiryu (JP); Kenji Sugaya, Kiryu (JP); Kazufumi Yamashita, Kiryu (JP); Toshio Maehara, Kiryu (JP); Shoji Oiwa, Kiryu (JP)

(73) Assignee: Nidec Servo Corporation, Gumma (JP)

( * ) Notice: Subject to any disclaimer, the term of this patent is extended or adjusted under 35 U.S.C. 154(b) by 547 days.

(21) Appl. No.: 12/275,516

(22) Filed: Nov. 21, 2008

(65) Prior Publication Data

US 2009/0134821 A1    May 28, 2009

(30) Foreign Application Priority Data

Nov. 27, 2007    (JP) ................. 2007-305603

(51) Int. Cl.
*H02P 6/08*    (2006.01)
(52) U.S. Cl. ............... 318/400.17; 318/400.29; 318/293
(58) Field of Classification Search .......... 318/700, 318/400.01, 400.04, 400.06, 400.17, 400.2, 318/400.29, 287, 291, 293
See application file for complete search history.

(56) References Cited

U.S. PATENT DOCUMENTS

| | | | | |
|---|---|---|---|---|
| 3,890,554 A * | 6/1975 | Yoshitake et al. | ............ | 318/696 |
| 5,089,761 A * | 2/1992 | Nakazawa | ............ | 318/811 |
| 5,859,519 A * | 1/1999 | Archer | ............ | 318/801 |
| 6,995,531 B2 | 2/2006 | Ichimaru et al. | | |
| 7,358,696 B2 * | 4/2008 | Iwanaga et al. | ............ | 318/293 |
| 7,781,998 B2 * | 8/2010 | Liu et al. | ............ | 318/400.26 |

FOREIGN PATENT DOCUMENTS

JP    3239054 B2    12/2001

* cited by examiner

*Primary Examiner* — Bentsu Ro
(74) *Attorney, Agent, or Firm* — Keating & Bennett, LLP

(57) ABSTRACT

A motor driving circuit for full-wave single-phase driving a motor includes a position detection unit, a turn-on signal generation unit, and switching devices that define an H-bridge circuit. The turn-on signal generation unit includes a differential amplifier arranged to produce a trapezoid wave signal, and a square wave generation circuit arranged to produce a square wave signal, wherein the trapezoid and the square wave signals are respectively supplied to control terminals of lower switching devices in the H-bridge circuit. Further, one of the lower switching devices is turned on and off according to a voltage level of the square wave signal, and the remaining lower switching device is turned on and off when a voltage of the trapezoid wave signal becomes higher than an operation voltage of the remaining lower switching device, wherein a non-conducting interval is provided for the motor coil according to the operation voltage.

9 Claims, 10 Drawing Sheets

FIG. 9A OUTPUT VOLTAGE OF HALL ELEMENT

FIG. 9B OUTPUT VOLTAGE OF DIFFERENTIAL AMPLIFIER

FIG. 9C OUTPUT VOLTAGE OF INVERTER CIRCUIT

FIG. 9D OPERATION OF TRANSISTOR Tr1

FIG. 9E OPERATION OF TRANSISTOR Tr2

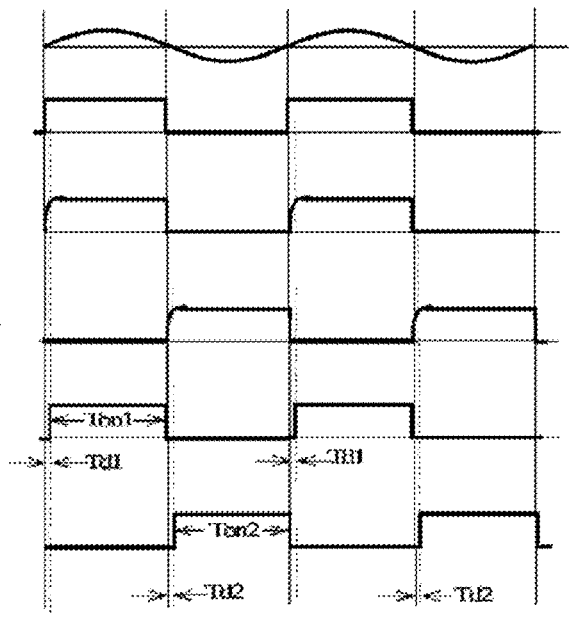
FIG. 11A PRIOR ART  OUTPUT VOLTAGE OF HALL ELEMENT
FIG. 11B PRIOR ART  OUTPUT VOLTAGE OF COMPARATOR 2
FIG. 11C PRIOR ART  OUTPUT VOLTAGE OF FIRST DEAD TIME CIRCUIT
FIG. 11D PRIOR ART  OUTPUT VOLTAGE OF SECOND DEAD TIME CIRCUIT
FIG. 11E PRIOR ART  GATE VOLTAGE OF TRANSISTOR Tr1
FIG. 11F PRIOR ART  GATE VOLTAGE OF TRANSISTOR Tr2

MOTOR DRIVING CIRCUIT

BACKGROUND OF THE INVENTION

1. Field of the Invention

The present invention relates to a motor driving circuit, and, more particularly, to a motor driving circuit for single-phase full-wave driving a single-phase brushless DC motor (hereinafter, simply referred to as a motor).

2. Description of the Related Art

In the case of driving a motor in a single-phase full-wave mode, an H-bridge circuit configuration is generally used. However, when a commutation occurs at a motor coil in an H-bridge circuit, transistors arranged at an upper arm and a lower arm in the H-bridge circuit may be short-circuited for an extremely short time interval at the times of turn-on and turn-off of each transistor, thereby causing a through current. For preventing such a through current, a generally employed method is to introduce a dead time at each of the times of the turn-on and turn-off of each transistor.

FIG. 10 is a circuit diagram showing a conventional motor driving circuit, which is disclosed in, e.g., Japanese Patent Application Publication No. 2005-269855.

In FIG. 10, the reference character 1 designates a Hall element for detecting positions of magnetic poles in a magnet. Further, a comparator circuit includes a first comparator 2 for converting an output voltage into a first square wave signal; and a second comparator 3 for producing a second square wave signal that corresponds to an inverse voltage of an output of the first comparator 2. Additionally, ZD refers to a Zener diode, R11-R21 refer to resistors, C11 and C12 refer to capacitors, and D11 and D12 refer to diodes.

Further, a dead time circuit includes a first dead time circuit having resistor R16 and capacitor C12 configured to smooth a rising edge in a voltage waveform of the first square wave signal; and a second dead time circuit having resistor R17 and capacitor C11 configured to smooth a rising edge in a voltage waveform of the second square wave signal.

In addition, an H-bridge circuit includes a lower arm having a first transistor Tr1 and a second transistor Tr2 which are MOSFET transistors; and an upper arm having a third transistor Tr3 and a fourth transistor Tr4 which are PNP transistors, and a motor coil 6.

FIGS. 11A to 11F are timing charts describing operations of the conventional motor driving circuit. More specifically, FIG. 11A shows an output voltage of the Hall element 1; FIG. 11B shows the first square wave signal obtained as the output voltage of the first comparator; FIG. 11C shows an output voltage of the first dead time circuit; FIG. 11D shows an output voltage of the second dead time circuit; FIG. 11E shows an ON/OFF signal of the first transistor Tr1; and FIG. 11F shows an ON/OFF signal of the second transistor Tr2.

By using the dead time circuits including resistors and capacitors, the rising times of the voltage waveforms of the first and the second square wave signal are increased as respectively shown in FIGS. 11C and 11D. Further, due to the influence of the cutoff voltage between the gate and the source of each of the transistors Tr1 and Tr2 on the turn-on and turn-off operations thereof, dead times Td1 and Td2 are secured while the transistors Tr1 and Tr2 are being turned on, respectively, as shown in FIGS. 11E and 11F. The dead times prevent the through currents at the respective transistors in the H-bridge circuit.

Further, as a method for enhancing the motor efficiency, it has been commonly proposed that the electric conduction is prohibited during an initial stage and a final stage of a half-period (equivalent to an electric angle of 180°) in a counter-electromotive force waveform, and is allowed during the time the counter electromotive force reaches a predetermined level. In this regard, Japanese Patent No. 3239054, for example, discloses a method of controlling a conduction angle in the case of half-wave driving.

As discussed above, in the conventional motor driving circuit, the dead time circuit has to be provided to prevent the through current that may flow through the motor coil during the time of a commutation. This increases the number of electric components, which in turn results in a cost increase. Further, also in case of driving the motor by setting a conduction angle for enhancing the motor efficiency, a relatively large number of electric components are required, thereby complicating the circuit.

SUMMARY OF THE INVENTION

In order to overcome the problems described above, preferred embodiments of the present invention provide a low-cost circuit configuration capable of driving the motor at a high efficiency without generating a through current in the case of full-wave driving of the motor by using an H-bridge circuit.

In accordance with a preferred embodiment of the present invention, it is possible to implement a low-cost driving circuit by using an H-bridge circuit that is capable of driving a motor with high efficiency without generating a through current by driving a turn-on signal generation circuit using a differential amplifier circuit and an inverter circuit based on operational amplifiers, setting a proper bias voltage for a Hall element and a proper gate cutoff voltage of a MOSFET, and adding a low pass filter (hereinafter abbreviated as LPF) and a hysteresis property to the differential amplifier circuit.

In accordance with a preferred embodiment of the present invention, a motor driving circuit is configured to provide a full-wave electric current through a single-phase motor coil, including a position detection unit arranged to detect a pole position of a multipole magnetized rotor magnet; a turn-on signal generation unit arranged to set a conducting direction of the motor coil in accordance with an output of the position detection unit; and switching devices arranged to define an H-bridge circuit to provide a bidirectional electric current through the motor coil in cooperation with the turn-on signal generation unit.

Herein, the turn-on signal generation unit preferably includes a differential amplifier that amplifies the output of the position detection unit to produce a trapezoid wave signal, and a square wave generation circuit arranged to convert the trapezoid wave signal to a square wave signal.

Further, the trapezoid wave signal and the square wave signal are respectively supplied to control terminals of lower switching devices in the H-bridge circuit.

Further, one of the lower switching devices, to which the square wave signal is supplied, is preferably turned on and off in accordance with a voltage level of the square wave signal; and a remaining one of the lower switching devices, to which the trapezoid wave signal is supplied, is preferably turned on and off when a voltage level of the trapezoid wave signal becomes higher than an operation voltage of the remaining one of the lower switching devices, the operation voltage being higher than a threshold level at which the trapezoid wave signal is converted to the square wave signal.

Furthermore, a non-conducting interval is provided to the motor coil in accordance with the operation voltage of the remaining one of the lower switching devices.

In the motor driving circuit described above, the differential amplifier may perform the function of a low pass filter.

Thus, a conduction interval with regard to a counter electromotive force waveform can be automatically changed according to the number of rotations of the motor.

In the motor driving circuit described above, the differential amplifier may have a hysteresis property. Thus, a chattering effect of a conducting direction during a commutation can be prevented.

Further, the driving circuit described above may be used over a wide range of temperatures by connecting a diode in parallel to input terminals via which a bias voltage is applied to a Hall element that defines the position detection unit.

In accordance with preferred embodiments of the present invention, the effects described below can be achieved with a simple circuit configuration by properly setting the circuit elements.

Firstly, a non-conducting interval is provided with a threshold voltage equal to a gate-source cutoff voltage of a MOSFET, and a gate voltage of the MOSFET is driven directly by a trapezoid waveform obtained by applying a differential amplification to an output voltage of a Hall element. Thus, a through current can be prevented during a commutation.

Further, the through current can be prevented more reliably by properly setting a DC bias voltage for the output voltage of the Hall element and the gate-source cutoff voltage of the MOSFET.

Further, by adding the function of an LPF to a differential amplifier, the non-conducting interval is automatically widened based on the number of rotations of the motor. Therefore, a through current can be prevented during a commutation even when rotating the motor at a high speed.

Additionally, since the function of the LPF is added to the differential amplifier, the rising rate of the trapezoid waveform is different from the falling rate thereof when reaching a target rotating speed such that the turn-on times of the two MOSFETs are approximately the same, and a non-conducting interval is created. Further, by properly arranging the Hall element relative to a motor coil, it is possible to set a conduction angle of the motor coil to be small, and to make an electric current flow through the motor coil during a conducting interval that maximizes the motor efficiency.

Further, a chattering effect of switching a conducting direction can be prevented and minimized at the time of a commutation by adding the hysteresis property to the differential amplifier.

Furthermore, by connecting a diode in a manner parallel to an input terminal of the Hall element, it is possible to prevent a temperature-caused change in a DC bias voltage of an output of the Hall element. Thus, the driving circuit can operate stably even when the surrounding temperature is changing.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 11A to 11F are timing charts describing operations of the conventional motor driving circuit.

DETAILED DESCRIPTION OF THE PREFERRED EMBODIMENTS

Hereinafter, preferred embodiments of the present invention will be described with reference to the drawings.

Figure 1:
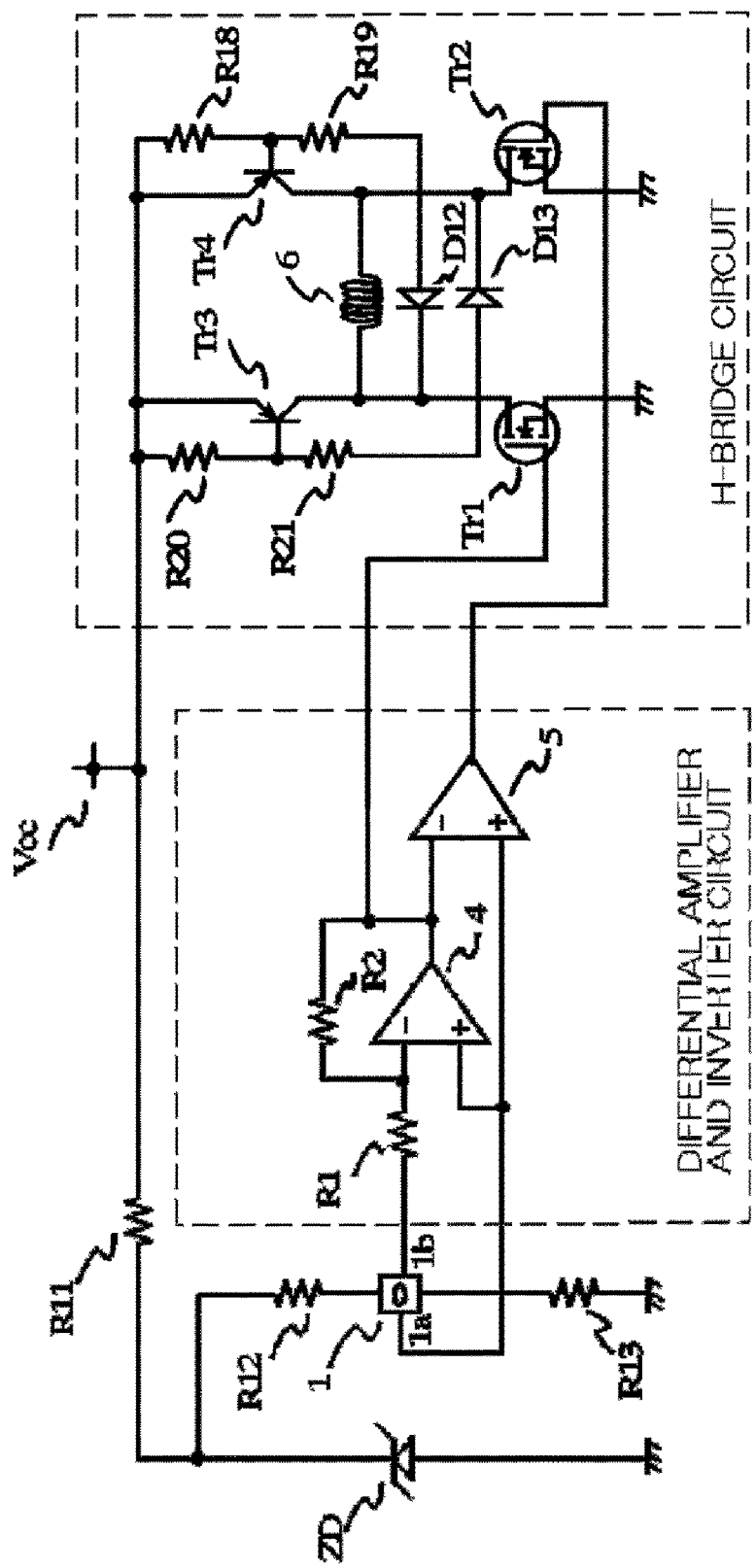
FIG. 1 is a circuit diagram of a motor driving circuit in accordance with a first preferred embodiment of the present invention.

FIG. 1 is a circuit diagram of a motor driving circuit in accordance with a first preferred embodiment of the present invention, and FIGS. 6A to 6H are timing charts describing operations thereof.

Figure 10:
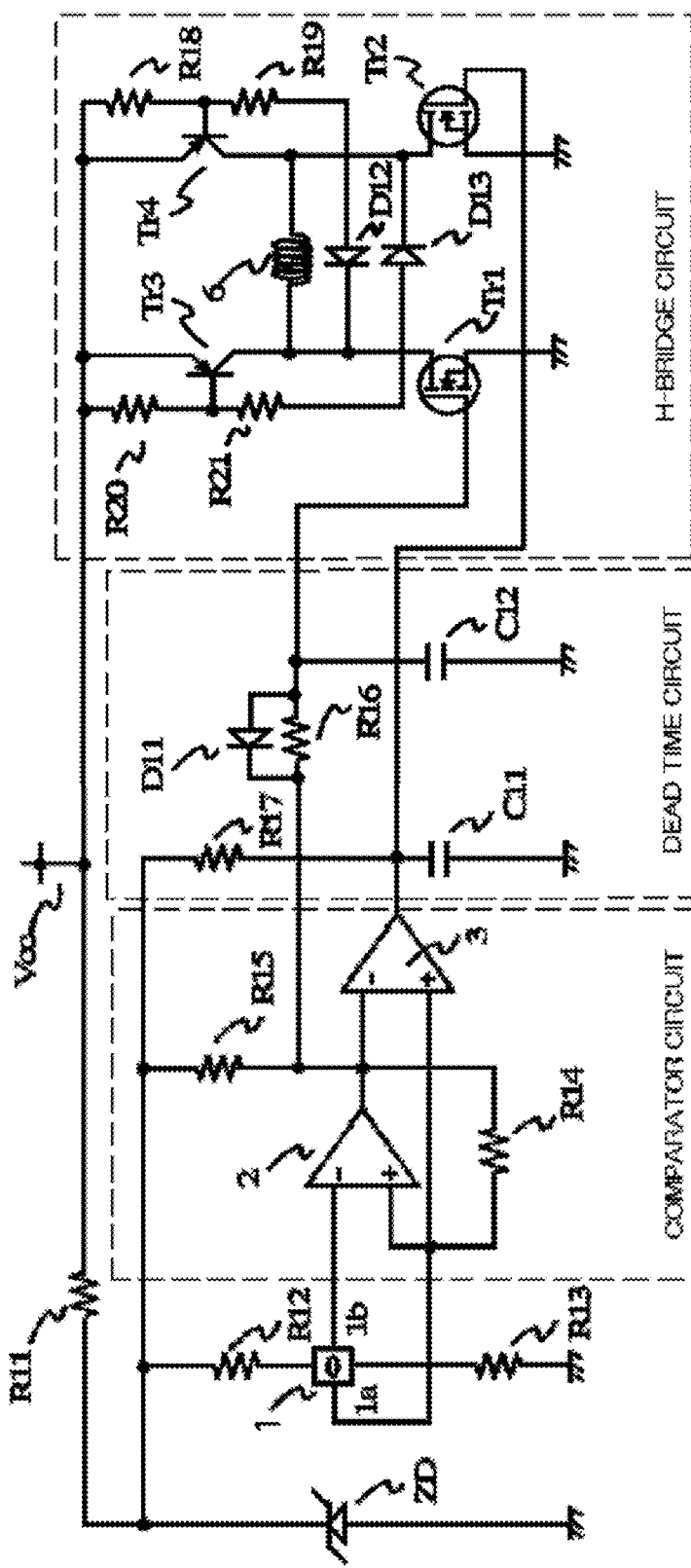
FIG. 10 is a circuit diagram showing a conventional motor driving circuit.

In FIG. 1, a reference character "ZD" designates a Zener diode that serves as a constant voltage source required for a differential amplifier circuit and an inverter circuit; "R12" and "R13" designate bias resistors setting a bias voltage of a Hall element 1; "R1" designates an input resistor connected to an inverting input terminal of an operational amplifier 4; and "R2" designates a feedback resistor of the operational amplifier 4. The operational amplifier 4 receives its inputs from output terminals 1a and 1b of the Hall element 1, and functions as a differential amplifier. Other elements shown in FIGS. 1 and 5 similar to those shown in FIG. 10 are denoted by similar reference characters and description thereof is omitted.

Further, by providing an operational amplifier 5 functioning as an inverter circuit, a square wave voltage is produced, wherein the polarity thereof is opposite to that of an output of the operational amplifier 4. The outputs of the differential amplifier circuit and the inverting circuit are supplied directly to transistors Tr1 and Tr2 that are preferably MOSFETs arranged as lower arm transistors in an H-bridge circuit.

Figure 6:
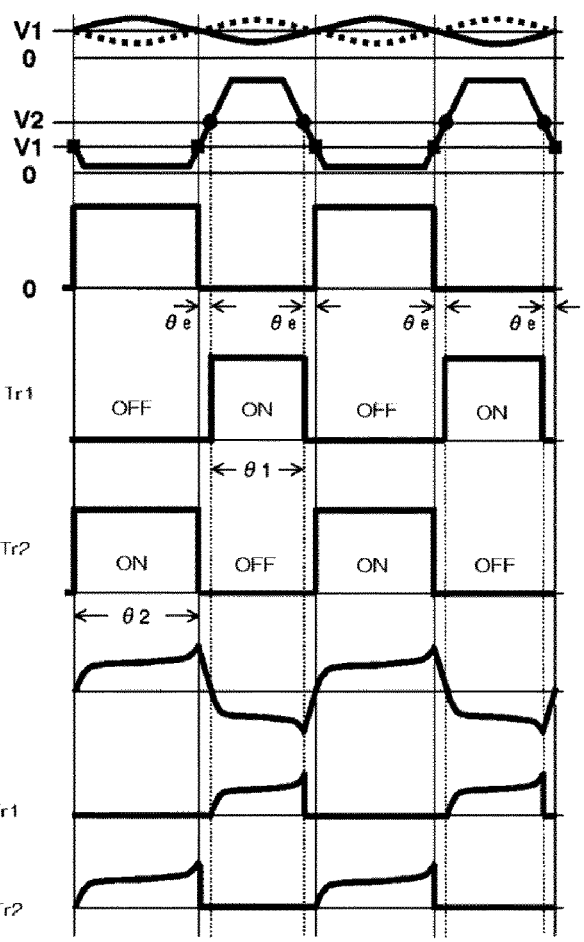
FIGS. 6A to 6H are timing charts describing operations of the motor driving circuit in accordance with the first preferred embodiment of the present invention.

FIGS. 6A to 6H are timing charts describing the operations in accordance with the first preferred embodiment of the present invention. In FIG. 6A, a solid line and a dotted line represent output voltage waveforms of the Hall element 1 observed at the output terminals 1b and 1a, respectively. These output voltage waveforms are offset by the DC bias voltage V1, and the phases thereof differ from each other by 180° in electric angle. The DC bias voltage V1 for the Hall element is equal to a DC level of each of the output terminals 1a and 1b when there is no magnetic flux entering through the Hall element. The voltage level of V1 is substantially determined by a voltage dividing ratio between the bias resistors R12 and R13 connected to the Hall element 1 and by a voltage obtained by adding a half of a voltage applied to the Hall element 1. In the driving circuit of the present preferred embodiment, V1 is preferably a value close to 0.5 V, for example.

FIG. 6B shows an output voltage waveform of the differential amplifier including the operational amplifier 4.

This output voltage alternately becomes higher or lower than the DC bias voltage V1 in a manner corresponding to an N pole or an S pole of a rotor magnet. The upper limit thereof is a voltage Vzd of the Zener diode ZD, and the lower limit thereof is approximately 0. In the driving circuit of the present preferred embodiment, the output voltage oscillates with reference to V1 (=0.5 V, for example) from about Vzd (=12 V, for example) to about 0 V.

FIG. 6C illustrates an output voltage of the operational amplifier 5 operating as a comparator, which shows a waveform whose polarity is opposite to that of the output of the differential amplifier. Since the non-inverting input terminal of the operational amplifier 5 is connected to the output terminal 1a of the Hall element 1, the output voltage of the comparator (i.e., the output voltage of the operational amplifier 5) becomes alternately higher and lower than the DC bias voltage V1 in a manner corresponding to the N pole and the S pole of the rotor magnet. That is, the output voltage of the differential amplifier (which is a trapezoid wave) and the output voltage of the inverter circuit (which is a square wave) cross each other at the voltage level of the DC bias voltage V1.

FIG. 6D describes turn-on and turn-off operations of the transistor Tr1 which is preferably a MOSFET, which is turned on and off depending on a voltage level of a gate-source cutoff voltage. A voltage V2 shown in FIG. 6B is the gate-source cutoff voltage of the MOSFET (i.e., the transistor Tr1), and preferably is equal to about 2.5 V, for example, in the driving circuit of the present preferred embodiment. The transistor is turned on when the gate voltage becomes higher than the gate-source cutoff voltage, and is turned off when the gate voltage becomes lower than or equal to the gate-source cutoff voltage. Since the gate voltage of the transistor Tr1 is equal to the output voltage of the differential amplifier, the conduction angle for the turn-on operation is θ1. As described above, by properly setting the DC bias voltage V1 and the gate-source cutoff voltage V2 of the MOSFET, a non-conducting interval θe can be achieved.

FIG. 6E describes turn-on and turn-off operations of the transistor Tr2 which is preferably a MOSFET. In this case, the output voltage waveform of the inverter circuit shown in FIG. 6C is a square wave, and the conduction angle of the transistor Tr2 is θ2.

Hereinafter, the reasons why the DC bias voltage V1 is preferably within a range from about 0.3 to about 1.0 V, for example, and the gate-source cutoff voltage V2 of the MOSFET is preferably within a range from about 1.5 to about 3.0 V, for example, will be described.

The operational amplifier 4 of the differential amplifier has a minimum magnitude of its output voltage amplitude and a minimum level in its input voltage range, and the DC bias voltage V1 needs to be set in such a manner to secure an appropriate margin for the minimum magnitude and the minimum level. Specifically, for example, the DC bias voltage V1 is higher than or equal to about 0.3 V to secure the minimum level in the input voltage range of the operational amplifier even when the DC bias voltage V1 overlaps with the output voltage amplitude of the Hall element.

Further, the gate-source cutoff voltage V2 ranges from about 0.5 to about 5.0 V, for example, and the turn-on resistance of the MOSFET increases as the cutoff voltage goes up. To drive the motor at a high efficiency, it is preferable to reduce the turn-on resistance of the MOSFET. In this regard, the voltage range from about 1.5 to about 3.0 V is efficient for driving a fan motor when considering the turn-on voltage and the withstand voltage of the MOSFET.

Figure 9:
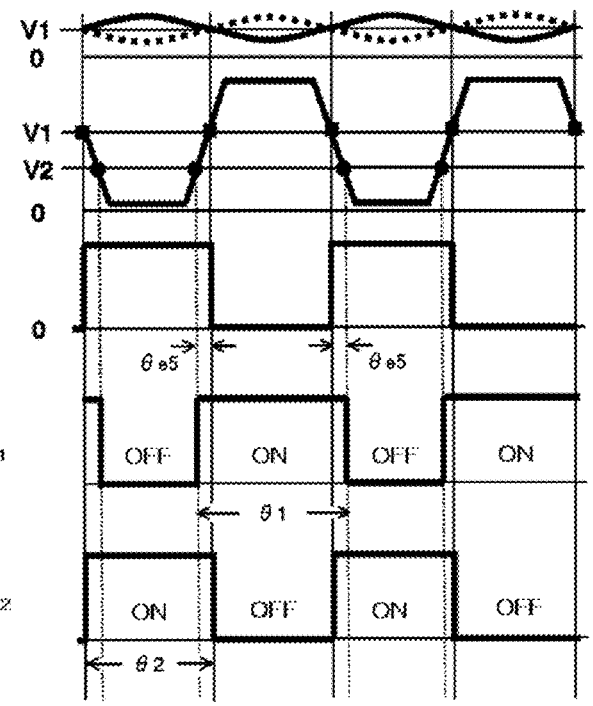
FIGS. 9A to 9E are timing charts describing operations of the motor driving circuit in accordance with another preferred embodiment of the present invention.

Further, the non-conducting interval is determined by a voltage difference between V1 and V2, and the condition of V1<V2 is required to secure the non-conducting interval. If V1 is higher than or equal to V2 as shown in FIG. 9B, the conduction angle θ1 of the differential amplifier exceeds 180° as shown in FIG. 9B, and the conduction angle θ2 of the inverter circuit also exceeds 180° as shown in FIG. 9C. In this case, the gate voltage of each of the transistors Tr1 and Tr2 is higher than the gate-source cutoff voltage thereof, so that there exists a conducting interval θe5 in which both of the transistors Tr1 and Tr2 are turned on, causing the through current.

From the above-discussed conditions regarding the operational amplifiers and the MOSFET, one can derive that it is necessary to meet the conditions of $0.3\,V \leq V\mathbf{1} \leq 1.0\,V$ and $1.5\,V \leq V\mathbf{2} \leq 3.0\,V$ to drive the fan motor with high efficiency, and to secure the non-conducting interval.

FIG. 6F shows a waveform of a motor coil current, and FIGS. 6G and 6H show waveforms of currents flowing through the transistors Tr1 and Tr2, respectively.

As described above, by securing the non-conducting interval θe during the commutation of the motor coil, the through current does not flow in the H-bridge circuit, and the current conduction in the motor coil is maintained.

However, in the circuit described above, a rotational torque is not generated in the non-conducting interval θe. This leaves the possibility that a dead point occurs when starting-up, which is typically observed in a single-phase motor. Therefore, the non-conducting interval is minimal. In this case, if the number of rotations is large when using the motor, the length of time equivalent to the non-conducing interval θe is reduced. If this length of time becomes shorter than the time during which the transistor is being turned off, there is a possibility that a through current may occur.

Further, the conduction angle θ1 of the transistor Tr1 is different from the conduction angle θ2 of the transistor Tr2, and conducting directions of the torques become slightly different. Meanwhile, the conduction angle θ2 is large enough to enable the current conduction in the entire 180° range of the electric angle. Further, the phase of the current may be deviated from that of the counter-electromotive force due to an error in accuracy in positioning the motor coil and the Hall element. Therefore, there may exist an interval in which a rotational torque directed opposite to the rotating direction of the motor is generated, thereby deteriorating the motor efficiency.

Figure 2:
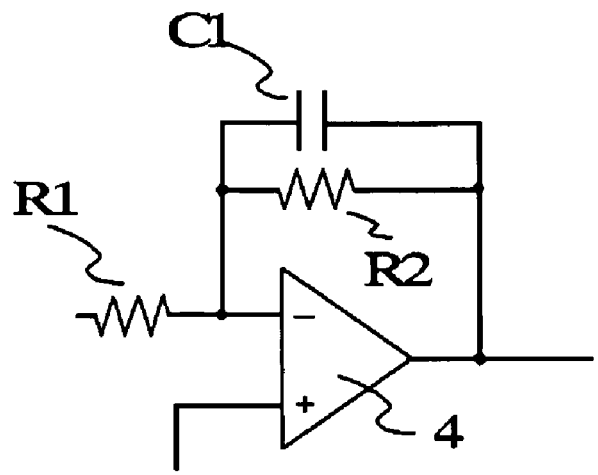
FIG. 2 is a circuit diagram including an operational amplifier in accordance with a second preferred embodiment of the present invention.
Figure 7:
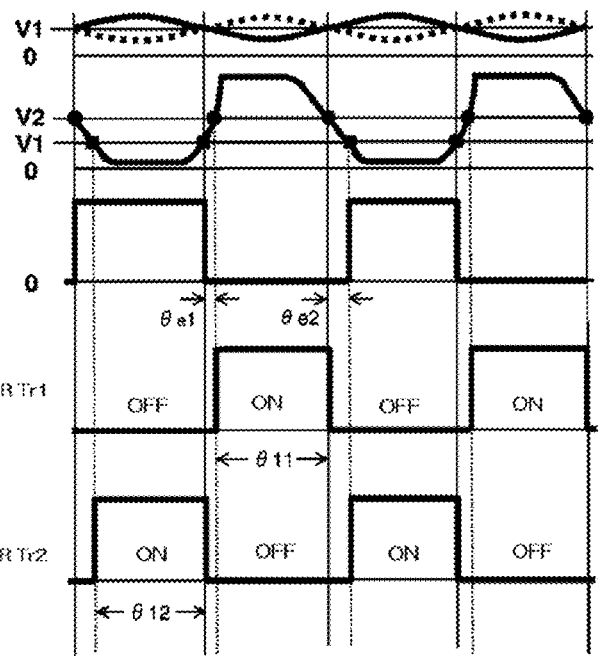
FIGS. 7A to 7E are timing charts describing operations of the motor driving circuit in accordance with the second preferred embodiment of the present invention.

FIG. 2 is a circuit diagram of a differential amplifier in accordance with a second preferred embodiment capable of further enhancing the performance of the motor with regard to the points discussed above. The differential amplifier shown therein further includes a feedback capacitor C1 connected in parallel to the feedback resistor R2 in the operational amplifier 4, defining an LPF. FIGS. 7A to 7E are timing charts showing the operations thereof. FIG. 7B shows an output voltage waveform of the LPF-added differential amplifier when the motor rotates at a high speed. The waveform of the rising and falling thereof is influenced by the LPF.

While the output voltage is rising, the feedback capacitor is electrically charged at the vicinity of the output voltage of 0 V, and the quantity of the previously charged electric charge is as small as the charge of the DC bias voltage V1 of about 0.5 V or lower. Therefore, the output of the differential amplifier rises at a relatively high speed.

On the other hand, while the output voltage is falling, the feedback capacitor C1 is electrically discharged at the vicinity of the output voltage of about 11 V, for example, and the quantity of the previously charged electric charge is large. Therefore, the falling time of the output voltage of the differential amplifier is longer.

Further, since the gate-source cutoff voltage V2 of the MOSFET that is actually in use is about 2.5 V, the output voltage of the LPF-added differential amplifier rises to the gate-source cutoff voltage V2 slightly later. However, it takes a longer time for the output voltage to fall from about 11 V to about 2.5 V.

FIG. 7C shows an output voltage of the inverter circuit, i.e., an inverse waveform of the output of the differential amplifier obtained by operating the operational amplifier 5 as a comparator. Since the rising time of the differential amplifier is slightly extended, the non-conducting interval θe1 is slightly longer than the non-conducting interval θe in FIG. 6C. Further, since the falling time thereof is greatly extended, the non-conducting interval θe2 is much longer than the non-conducting interval θe in FIG. 6C. Therefore, the cross point between the DC bias voltage V1 and the output voltage of the differential amplifier is shifted, so that the voltage width of the output voltage of the inverter circuit is reduced by a delayed amount of the falling time.

FIGS. 7D and 7E show the turn-on and turn-off operations of the transistors Tr1 and Tr2 defined by the MOSFETs. The conduction angle θ11 of the transistor Tr1 is approximately equal to the conduction angle θ12 of the transistor Tr2. Further, each of the conduction angles is smaller than 180°.

As the number of rotations of the motor increases, the non-conducting intervals θe1 and θe2 become longer. Thus, it can be assured that the length of time corresponding to the non-conducting interval is longer than the interval of the transistor being off, thereby preventing the through current.

Further, by properly arranging the motor coil and the Hall element, the motor can be driven at a high efficiency without generating a reverse rotational torque.

Figure 3:
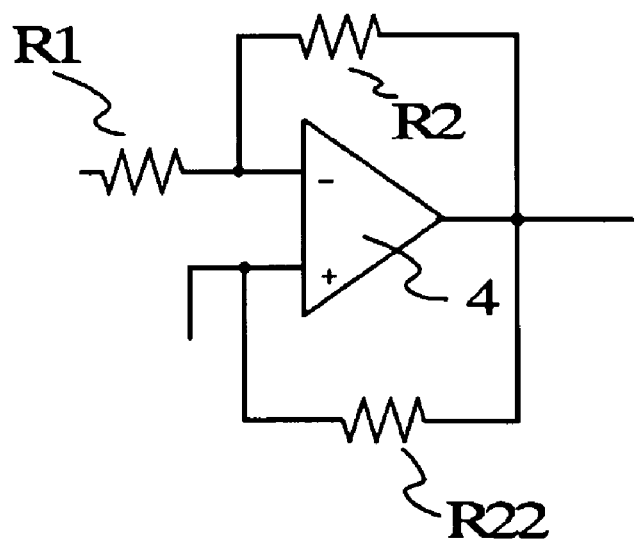
FIG. 3 is a circuit diagram including an operational amplifier in accordance with a third preferred embodiment of the present invention.

FIG. 3 is a circuit diagram showing a circuit configuration of a third preferred embodiment of the present invention capable of preventing a chattering effect of switching a conducting direction at the time of a commutation. In this circuit configuration, a positive feedback loop is connected to the operational amplifier that defines the differential amplifier to provide therewith a hysteresis property, wherein a resistor R22 is further inserted between the non-inverting input terminal and the output terminal of the operational amplifier 4.

Figure 8:
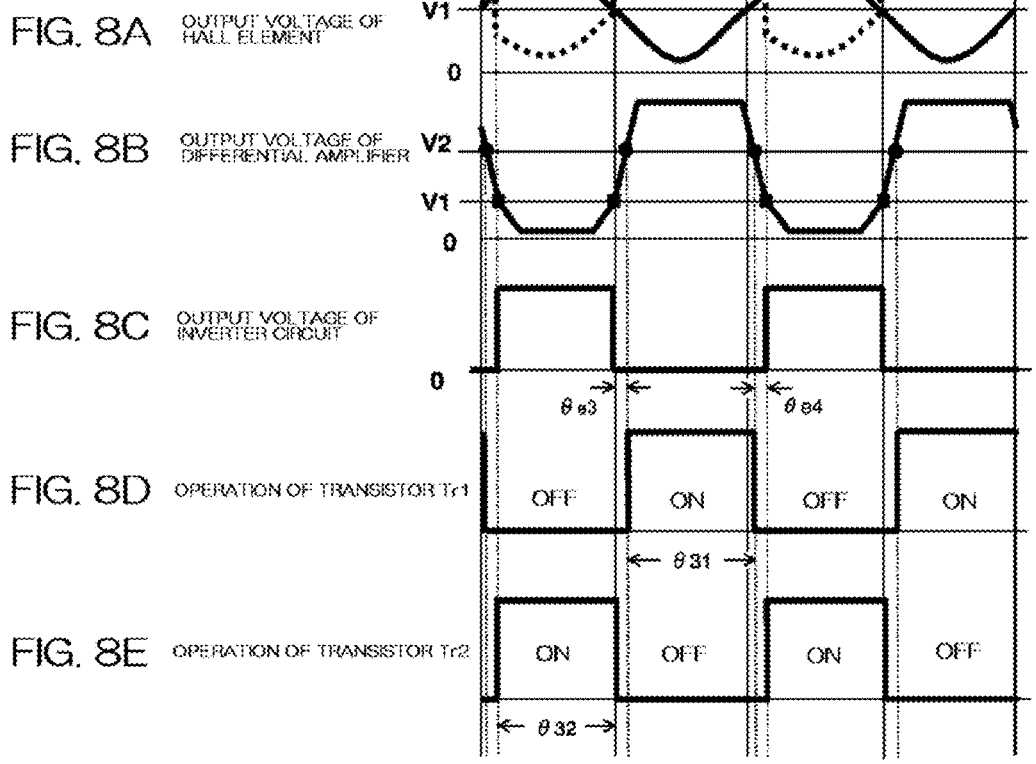
FIGS. 8A to 8E are timing charts describing operations of the motor driving circuit in accordance with the third preferred embodiment of the present invention.

FIGS. 8A to 8E are timing charts of the case where the hysteresis property is added to the differential amplifier circuit. In FIG. 8A, a dotted line indicates an output voltage waveform of the output terminal 1a of the Hall element 1. Due to the hysteresis property, the output voltage waveform of the output terminal 1a changes abruptly near cross points between the output terminals 1a and 1b of the Hall element 1, and the DC bias voltage waveform V1 crosses the output voltage waveform of the differential amplifier at shifted points. Thus, the chattering effect can be prevented and minimized, and the conduction angles of the transistors Tr1 and Tr2 are changed to θ31 and θ32, respectively.

Figure 4:
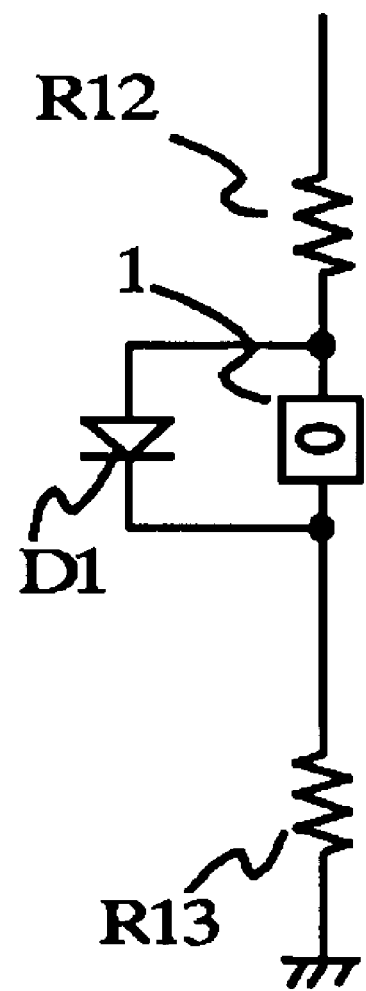
FIG. 4 is a circuit diagram including a Hall element in accordance with a fourth preferred embodiment of the present invention.

FIG. 4 is a circuit diagram showing a circuit configuration of a fourth preferred embodiment of the present invention. As shown therein, by connecting a diode D1 in parallel to the input terminals of the Hall element 1, a temperature change in the DC bias voltage V1 of the output of the Hall element 1 can be prevented and minimized, so that the driving circuit of the present preferred embodiment can operate stably even when the surrounding temperature changes.

The rate of temperature change in the output voltage of the Hall element formed of indium antimonide and/or the like is equal to about −1.8%/C.°, and the rate of temperature change in the input resistance is also equal to about −1.8%/C.°, which are noticeably large values. The temperature characteristics of the Hall element can be greatly enhanced when driven by a constant voltage source. However, it requires a higher cost and a larger power consumption to install a constant voltage source dedicated for the Hall element with a low voltage.

A configuration in which the diode is connected in parallel to the input terminals of the Hall element has been used to prevent and minimize the temperature change in the output voltage of the Hall element 1. However, in accordance with the present preferred embodiment, this configuration is used to prevent the temperature change in the DC bias voltage for the output of the Hall element 1.

In a bias scheme without the diode D1, the temperature characteristics of the input resistance of the Hall element 1 are such that the voltage level applied to the Hall element 1 is remarkably reduced at a high temperature, and the DC bias voltage V1 for the output terminals 1a and 1b of the Hall element 1 is also lowered. This causes a change in the conducting interval, which is significant in view of the present preferred embodiment. Meanwhile, the diode D1 undergoes a temperature change of about −2 mV/C.°, which is much smaller compared to the temperature change in the input resistance of the Hall element 1. Further, by connecting the diode D1 in parallel to the input terminals of the Hall element, the DC bias voltage V1 of the output voltage of the Hall element 1 can be prevented and minimized.

Figure 5:
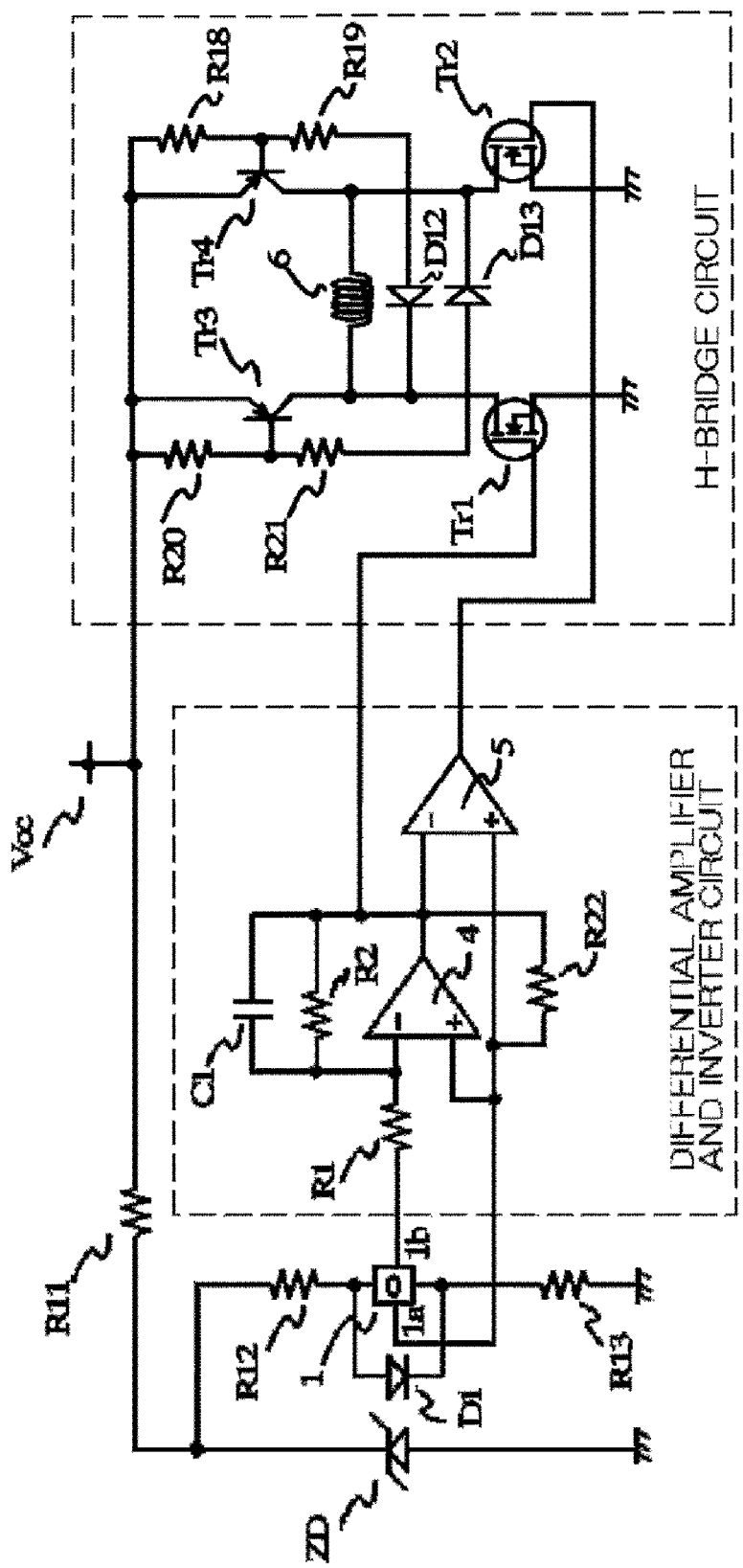
FIG. 5 is a circuit diagram of a motor driving circuit in accordance with another preferred embodiment of the present invention.

As discussed above, each circuit configuration of the second to fourth preferred embodiments of the present invention further includes an element that is additional to the configuration of the first preferred embodiment, which may be properly determined in consideration of the characteristics of the motor to be used. FIG. 5 shows a circuit configuration that can be used for all kinds of fan motors. In this manner, the through current can be prevented during the commutation, and the motor can be driven with high efficiency as a result of the operations described above.

In accordance with the preferred embodiments of the present invention as described above, it is possible to provide a low-cost driving circuit capable of a single-phase full-wave driving of a motor used for a wide range of fields while improving the motor characteristics.

While the invention has been shown and described with respect to the preferred embodiments, it will be understood by those skilled in the art that various changes and modifications may be made without departing from the scope of the invention as defined in the following claims.

What is claimed is:

1. A motor driving circuit for providing a full-wave electric current through a single-phase motor coil, the motor driving circuit comprising:
    a position detection unit arranged to detect a pole position of a multipole magnetized rotor magnet;
    a turn-on signal generation unit arranged to set a conducting direction in the motor coil according to an output of the position detection unit; and
    switching devices defining an H-bridge circuit arranged to provide a bidirectional electric current through the motor coil in cooperation with the turn-on signal generation unit; wherein
    the turn-on signal generation unit includes a differential amplifier arranged to amplify the output of the position detection unit to produce a trapezoid wave signal, and a square wave generation circuit arranged to convert the trapezoid wave signal to a square wave signal;

the trapezoid wave signal and the square wave signal are supplied to a respective control terminal of each of first and second lower switching devices in the H-bridge circuit;

the first lower switching device, to which the square wave signal is supplied, is turned on and off according to a voltage level of the square wave signal;

the second lower switching devices, to which the trapezoid wave signal is supplied, is turned on and off when a voltage level of the trapezoid wave signal becomes higher than an operation voltage of the second lower switching device, the operation voltage being higher than a threshold level at which the trapezoid wave signal is converted to the square wave signal; and a non-conducting interval is provided to the motor coil according to the operation voltage of the second lower switching device.

2. The motor driving circuit of claim 1, wherein the H-bridge circuit includes first and second arms, each of which has at least two switching devices connected in series;

the motor coil is connected between a contact point of the at least two switching devices in the first arm and another contact point of the at least two switching devices in the second arm;

each of the first and second lower switching devices is respectively arranged in a lower portion of the two arms, each of the first and second lower switching devices is a MOSFET; and the operation voltage of the second lower switching device is equal to a gate-source cutoff voltage of the MOSFET.

3. The motor driving circuit of claim 2, wherein the position detection unit includes a Hall element arranged to output an alternating voltage according to a magnetic polarity of the rotor magnet; and the gate-source cutoff voltage is higher than a DC bias voltage of the alternating voltage outputted from the position detection unit.

4. The motor driving circuit of claim 3, wherein a bias voltage applied to the position detection unit is set such that the DC bias voltage for the alternating voltage outputted from the position detection unit is about 0.3 V to about 1.0 V; and the first and second lower switching devices each have a gate-source cutoff voltage of about 1.5 V to about 3.0 V.

5. The motor driving circuit of claim 1, wherein the differential amplifier is a low pass filter.

6. The motor driving circuit of claim 1, wherein the differential amplifier has a hysteresis property.

7. The motor driving circuit of claim 1, wherein the position detection unit includes a Hall element arranged to output an alternating voltage according to a magnetic polarity of the rotor magnet, and a diode is connected in parallel to input terminals of the position detection unit through which a bias voltage is applied thereto.

8. The motor driving circuit of claim 1, wherein the square wave generation circuit includes an inverter circuit having an operational amplifier.

9. A motor driving circuit for providing a full-wave electric current through a single-phase motor coil, the motor driving circuit comprising:

a Hall element arrange to detect a pole position of a multipole magnetized rotor magnet;

a turn-on signal generation unit arranged to set a conducting direction of the motor coil according to an output of the Hall element; and an H-bridge circuit arranged to provide an electric current through the motor coil in cooperation with the turn-on signal generation unit, the H-bridge circuit including first and second lower switching devices defined by MOSFETs in lower portions of two arms thereof; wherein the turn-on signal generation unit includes a differential amplifier arranged to amplify the output of the Hall element to produce a trapezoid wave signal, and an inverter circuit arranged to convert the trapezoid wave signal to produce a square wave signal;

either the trapezoid wave signal or the square wave signal is supplied to a respective control terminal of each of the first and second lower switching devices in the H-bridge circuit;

the first lower switching device, to which the square wave signal is supplied, is turned on and off according to a signal level of the square wave signal;

either the trapezoid wave signal or the square wave signal is supplied to a respective gate terminal of each of the first and second lower switching devices in the H-bridge circuit;

a bias voltage applied to the position detection unit is set such that the DC bias voltage for the alternating voltage outputted from the position detection unit is about 0.3 V to about 1.0 V; and the first and second lower switching devices each have a gate-source cutoff voltage of about 1.5 V to about 3.0 V.

* * * * *